United States Patent [19]

Erickson

[11] Patent Number: 4,521,398
[45] Date of Patent: Jun. 4, 1985

[54] CONTROLLED TEMPERATURE EXPANSION IN OXYGEN PRODUCTION BY MOLTEN ALKALI METAL SALTS

[75] Inventor: Donald C. Erickson, Annapolis

[73] Assignee: Air Products and Chemicals, Inc., Allentown, Pa.

[21] Appl. No.: 514,742

[22] Filed: Jul. 18, 1983

[51] Int. Cl.³ .................................... C01B 13/02
[52] U.S. Cl. ..................... 423/579; 423/210.5; 423/219
[58] Field of Search ............ 423/579, 210.5, 219, 423/385, 395, DIG. 12

[56] References Cited

U.S. PATENT DOCUMENTS

| | | | |
|---|---|---|---|
| 2,418,402 | 8/1944 | Gorin | 423/210.5 |
| 3,579,292 | 5/1971 | Mullhaupt et al. | 23/2 |
| 3,856,928 | 12/1974 | Tarman et al. | 423/579 |
| 3,937,010 | 2/1976 | Kosaka et al. | 423/219 X |
| 3,980,763 | 9/1976 | Mullhaupt | 423/579 |
| 4,026,680 | 5/1977 | Collins | 55/26 |
| 4,089,938 | 5/1978 | Turner | 423/579 |
| 4,132,766 | 1/1979 | Erickson | 423/579 |
| 4,287,170 | 9/1981 | Erickson | 423/579 |
| 4,340,578 | 7/1982 | Erickson | 423/579 |

FOREIGN PATENT DOCUMENTS 2930523  2/1981  Fed. Rep. of Germany ...... 423/219

*Primary Examiner*—Donald R. Valentine
*Attorney, Agent, or Firm*—Geoffrey L. Chase; E. Eugene Innis; James C. Simmons

[57] ABSTRACT

A continuous process is set forth for the production of oxygen from an oxygen containing gas stream, such as air, by contacting a feed gas stream with a molten solution of an oxygen acceptor to oxidize the acceptor and cyclically regenerating the oxidized acceptor by releasing oxygen from the acceptor wherein the oxygen-depleted gas stream from the contact zone is treated sequentially to temperature reduction by heat exchange against the feed stream so as to condense out entrained oxygen acceptor for recycle to the process, combustion of the gas stream with fuel to elevate its temperature and expansion of the combusted high temperature gas stream in a turbine to recover power.

12 Claims, 1 Drawing Figure

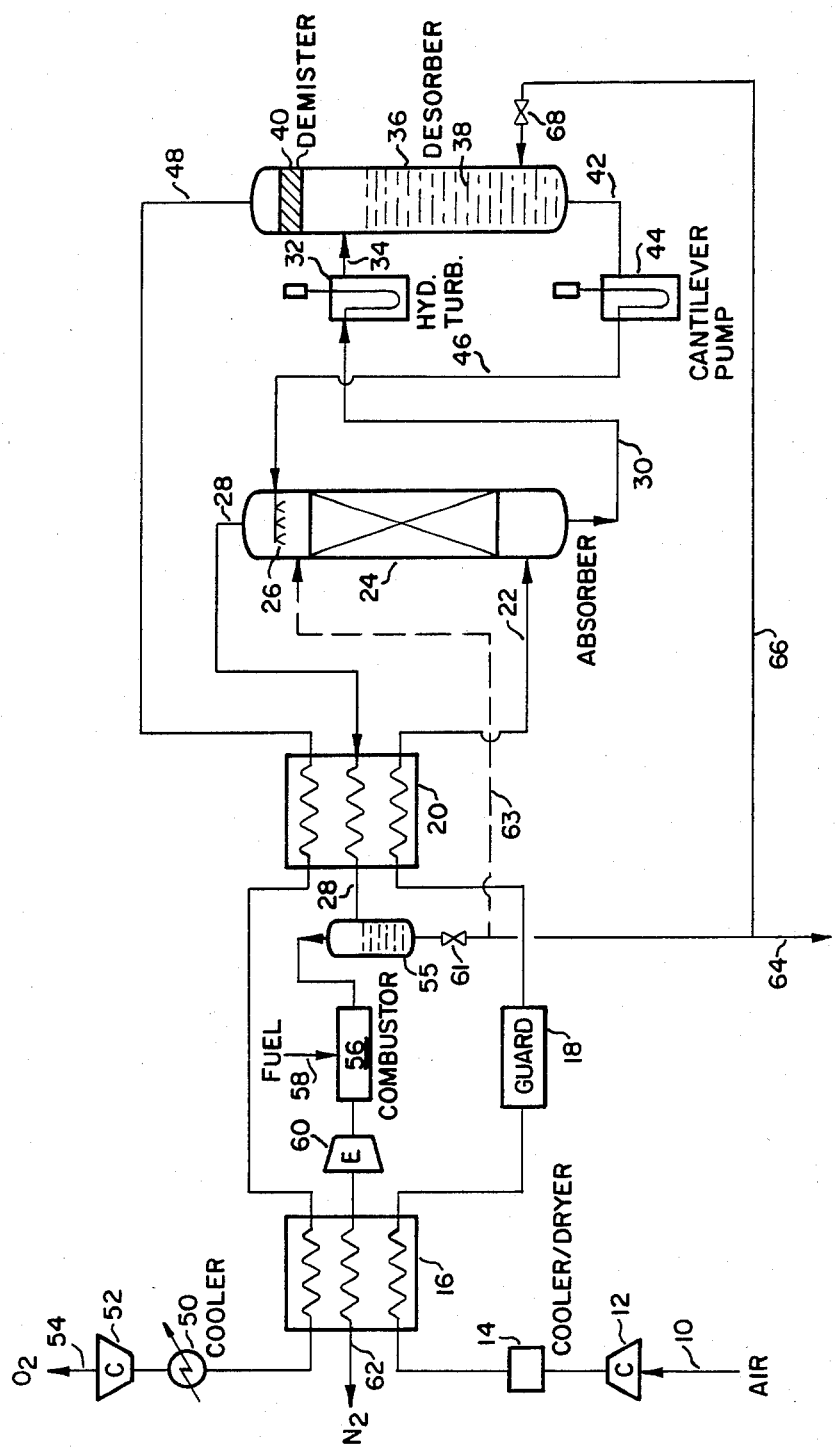

4,521,398

CONTROLLED TEMPERATURE EXPANSION IN OXYGEN PRODUCTION BY MOLTEN ALKALI METAL SALTS

TECHNICAL FIELD

The Government of the United States of America has rights in this invention pursuant to Contract Number DE-AC01-79CS40287 awarded by the U.S. Department of Energy.

The present invention is related to a process wherein oxygen is produced by a chemical reaction with an oxygen-containing gas stream, such as air. Specifically, the present invention is directed to an improved thermodynamic operation of a process for the recovery of oxygen from a gas stream using a chemical oxygen acceptor which absorbs and desorbs oxygen in a cyclic process.

BACKGROUND OF THE PRIOR ART

Various chemical oxygen acceptors are known in the prior art.

In U.S. Pat. No. 2,418,402 a process for the recovery of oxygen utilizes a combination of metallic chlorides as an oxygen absorbing material.

A strontium oxide-peroxide reaction mass is used in U.S. Pat. No. 3,579,292 in order to provide an oxygen absorbing medium for the recovery of oxygen from a gas stream.

In U.S. Pat. No. 3,856,928 a combination of magnesium oxide, calcium oxide and barium oxide are utilized to recover oxygen from an air stream. A lean air stream from the process is combusted with fuel, heat exchanged, combusted with additional fuel or combined with steam before being expanded in a turbine for the recovery of power, after which the expanded lean air product is heat exchanged against feed air to the process.

U.S. Pat. No. 3,980,763 discloses the use of praseodymium and cerium oxides as oxygen carriers in a cyclic oxidation-reduction process for the separation of oxygen from air.

The use of zeolitic molecular sieve beds in a pressure swing adsorption process is disclosed in U.S. Pat. No. 4,026,680. That patent does not constitute a chemical acting adsorption scheme.

U.S. Pat. No. 4,089,938 teaches the use of a suspension of manganese dioxide in an aqueous solution of sodium or potassium hydroxide as an oxygen absorbing medium for the recovery of oxygen from air. The vented oxygen-depleted gas stream is heat exchanged with the feed gas stream to the absorption zone of the process.

U.S. Pat. No. 4,287,170, to the present inventor, discloses a chemical absorption process for the recovery of both oxygen product and nitrogen product, wherein the nitrogen product is further separated from oxygen in a scavenging cycle before expansion in a turbine. The nitrogen product is heat exchanged against the incoming feed air stream to the overall process.

The use of alkali metal salts comprising molten solutions of nitrate and nitrite, wherein the ratio of nitrate to nitrite is maintained greater than 0.3 for the separation of oxygen from air is set forth in U.S. Pat. No. 4,132,766, also to the present inventor. The oxygen-depleted air stream is expanded through a turbine in order to provide power for the compression of the feed air stream. The oxygen-depleted air stream is also contemplated for partial expansion, reheating and then additional expansion. The stream is then contemplated for optional combustion in order to provide heat for the heater 8 of the process flow scheme.

U.S. Pat. No. 4,340,578 to the present inventor, discloses specific compositions of alkali metal nitrates and nitrites, which can be used in an oxygen producing chemical absorption process. The process contemplates the combustion of the oxygen-depleted air stream with fuel in a combustion zone 6 prior to expansion in a turbine 7 and heat exchange of the expanded stream with the feed air stream in a heat exchanger 4 for further expansion in the turbine 8.

Despite the various disclosures of chemical oxygen absorber processes, the prior art has failed to provide an overall integrated process, which is energy efficient and provides conservation of process materials, along with compatability of process streams with process equipment. The present invention is deemed to provide such advantages.

BRIEF SUMMARY OF THE INVENTION

The present invention comprises a continuous process for producing oxygen from an oxygen-containing gas feed stream by the repeated steps of contacting a feed stream, such as air, with a molten solution of alkali metal nitrate and alkali metal nitrite oxygen acceptor, which becomes oxidized by the reaction of the acceptor with the free oxygen in the feed stream. The oxygen acceptor remains liquid in its oxidized condition. The oxidized acceptor is removed to a separate desorption zone for releasing the oxygen from the oxidized oxygen acceptor so as to regenerate the oxygen acceptor and generate a product oxygen gas. The regenerated oxygen acceptor is recycled to the absorption or contact zone for further oxidation with fresh feed gas. An oxygen-depleted gas stream is removed from the contact or adsorption zone, and the temperature of the oxygen-depleted ga stream is reduced by heat exchange with the feed stream to the process. Residual oxygen acceptor entrained in the oxygen-depleted gas stream is condensed out of the gas stream upon the reduction of the temperature of the stream. This condensed oxygen acceptor is collected and preferably returned to the desorption zone for recycle through the process. The oxygen-depleted gas stream, now free of entrained oxygen acceptor, is then mixed with a fuel source, and the residual oxygen content of the gas stream is combusted to elevate the temperature of the gas stream for maximum efficiency in expansion of the gas stream through a turbine to recover power from the elevated pressure gas stream. The expanded gas stream is then reduced in temperature by heat exchange with the feed air stream in a second such exchange whereby the feed air stream is warmed to an elevated temperature before being subjected to the oxygen acceptor contact.

Preferably, the feed air stream comprises air which is compressed in a compressor driven by the expander turbine for the oxygen-depleted gas stream. After compression, the high pressure feed air stream is aftercooled against an external cooling fluid, such as water, and dried to remove carbon dioxide and water.

A further preferred operation includes the reduction in temperature of the oxygen product stream in heat exchange with the feed air stream and compression of the oxygen product stream through a compressor to the required delivery pressure.

In the preferred process, sodium constitutes the predominant alkali metal cation of the oxygen acceptor. Additionally, at least two molar percent of alkali metal oxides, peroxides or superoxides or their combination is contained in the oxygen acceptor.

BRIEF DESCRIPTION OF THE DRAWING

The FIGURE shows a flowscheme of the preferred embodiment of the present invention for the production of oxygen with a chemical oxygen acceptor.

DETAILED DESCRIPTION OF THE INVENTION

The process of the present invention offers an alternative to traditional cryogenic separations for the production of oxygen from an oxygen-containing feed gas stream, such as air. The reversible chemical reaction scheme of the present invention provides the potential for reduced energy requirements in performing the separation of air or an oxygen-containing gas stream to produce product oxygen.

The use of alkali metal nitrate-alkali metal nitrite combinations in a molten liquid solution provides ease of process performance in conducting a continuous isolation of oxygen from an oxygen-containing feed gas or air. A preferred oxygen acceptor solution would constitute a mixture of alkali metal nitrate and nitrite, wherein the predominant alkali metal cation is sodium, there is preferably some potassium cation in lesser mole percentage than the sodium, and there is optionally at most about 10 mole percent of lithium cation. Minor amounts of other alkali metal cations, rubidium and cesium, may also be present. There may also be minor amounts of other cations present, particularly alkaline earth cations, such as barium and magnesium. It is essential that the oxygen acceptor contains at least two molar percent of alkali metal oxides, peroxides and superoxides taken in combination. This amount can be formed and can be maintained in the molten liquid solution during operation of the process, provided that no poisoning materials, such as carbon dioxide or water are introduced into the solution by the feed gas stream. Such poisoning materials would consume the oxides.

In all chemical air separation processes, the most fundamental characteristic to be considered is the equilibrium oxygen partial pressure. The essence of all processes in this field is to first contact air or an oxygen-containing gas stream with an oxygen acceptor having a partial pressure of oxygen lower than the partial pressure of oxygen in the donating gas stream, such as air. This makes possible the desired reaction between the oxygen acceptor and the free oxygen in the air or oxygen-containing feed stream. Reaction conditions, such as temperature, contact dynamics, residence time and pressure must be such that the reaction between the free oxygen and the oxygen acceptor will proceed at an acceptably rapid rate. No matter how rapid the rate, however, the reaction thermodynamically cannot proceed beyond the point at which the partial pressure of oxygen in the air or oxygen-containing feed stream equals the partial pressure of oxygen in the acceptor. If full equilibrium is attained, the partial pressure of oxygen in the oxygen-depleted gas stream exhausting from the process will be equal to the partial pressure of oxygen in the acceptor. Thus, if the partial pressure of oxygen in the incoming air or oxygen-containing feed stream is only slightly above the partial pressure of oxygen in the acceptor, only a small portion of the oxygen in the air or gas stream can react and become bound to the oxygen acceptor. However, if the partial pressure of oxygen in the incoming air or feed stream is substantially above the partial pressure of oxygen in the acceptor, most of the oxygen can react to become bound to the oxygen acceptor. The next step of all chemical separation processes after oxidizing the oxygen acceptor is to expose the oxidized oxygen acceptor to an atmosphere in which the existing partial pressure of oxygen is lower than the partial pressure of oxygen of the oxidized acceptor. This causes the acceptor to decompose and release free oxygen, since the escaping tendency of the oxygen from the acceptor is greater than the escaping tendency of the oxygen from the low oxygen partial pressure atmosphere. The atmosphere with the required low partial pressure for oxygen can be provided by drawing a vacuum, in which case, fairly pure oxygen is collected, or it can be provided by sweeping the acceptor with a diluent gas such as nitrogen, air or steam in which case the evolved oxygen will have the corresponding impurity present. Similar to the oxidation reaction, the decomposition reaction must be conducted under conditions such that its rate is acceptably rapid. Process economics dictate that both reactions achieve a near approach to equilibrium conditions. For the decomposition reaction, the partial pressure of oxygen of the product gas being collected from that reaction cannot exceed the partial pressure of oxygen of the acceptor undergoing decomposition.

The present invention constitutes an improvement in process procedures on the alkali metal nitrate-nitrite chemical oxygen separation scheme set forth in U.S. Pat. No. 4,132,766 and U.S. Pat. No. 4,340,578. In those patents, the thermodynamics of the oxygen acceptor separation process are set forth in detail, and several particular basic flowschemes for the recovery of oxygen from a feed stream, such as air, are described in detail. Much of the principles of those patents are relevant to the present invention, and, therefore, the descriptions of U.S. Pat. No. 4,132,766 and U.S. Pat. No. 4,340,578 are hereby incorporated by reference into the description of the present invention.

The present invention will be described in greater detail with reference to the drawing which illustrates a preferred embodiment of the invention. The preferred embodiment will be described with respect to the isolation of oxygen from air, but this should not be deemed to be a limitation on the invention which can be construed to be used for the isolation of oxygen from any oxygen-containing gas stream. Referring to the drawing, an air stream in line 10 is introduced into the process and is compressed in a compressor 12 to an elevated pressure. The compressed air stream is then aftercooled and dried in a known manner. The aftercooling function can be performed in a heat exchanger against an external cooling fluid, such as a refrigeration source or preferably cooling water at ambient conditions. After compression and the removal of the heat of compression, water and potentially hydrocarbons are condensed out of the air stream. Residual water and carbon dioxide can then be removed in drying equipment, such as switching molecular sieve beds or switching regenerating heat exchangers. Such switching beds are well known in the art and do not require further elaboration. However, the switching beds do require a dry carbon dioxide-free regenerating gas in order to extract the absorbed water and carbon dioxide from the bed. Any dry carbon dioxide-free gas would suffice to perform this function, and, in fact, a portion of the product or the oxygen-depleted gas from the process could possibly be used, if it is removed prior to combustion of the latter gas stream. Alternately, a source of nitrogen gas external from the process may be used for such regeneration. The cooling and drying function of the process is illustrated as apparatus 14 in the drawing and is not shown in greater detail due to its conformance with known process equipment. The compressed air stream from the cooler/dryer 14 is then warmed in heat exchanger 16 against process streams, namely an oxygen-depleted gas stream in line 62 containing predominantly nitrogen and an oxygen product stream in line 48. The elevated temperature feed air stream is then passed through a guard adsorber 18. The guard adsorber preferably constitutes a bed of barium oxide, which is used to insure that final traces of moisture or carbon dioxide do not reach the absorption zone of the process. The guard adsorber may be used in a paired configuration in order to insure regeneration, or a single guard adsorber may be utilized where the potential water and carbon dioxide content will be sufficiently low that the active time of the adsorber 18 will be reasonable with respect to the continuous operation of the overall process.

The feed air stream from adsorber 18 is then further warmed in heat exchanger 20 against process streams as described in heat exchanger 16. The feed air stream now in line 22 is introduced into the base of an absorption column 24 which contains a molten solution of alkali metal nitrate and alkali metal nitrite. These chemicals in solution constitute the oxygen acceptor species which chemically binds free oxygen from the feed air stream. The oxygen acceptor is introduced into the head of the absorption column in dispersing nozzles 26. The acceptor contacts the feed air countercurrently. Oxidized oxygen acceptor salts containing the net oxygen product are removed as a liquid in line 30 from the base of the absorber or absorption column 24. A hydraulic turbine 32 is connected in the flowpath of the oxidized oxygen acceptor in line 30 to produce a pressure reduction zone and to recover power in the reduction of the pressure of the liquid oxygen acceptor in line 30 as it passes into line 34.

The reduced pressure oxidized oxygen acceptor is introduced into a desorber 36 constituting a desorption column where the oxygen is released from the oxygen acceptor. The oxygen is released from the oxygen acceptor by the reduction in pressure in the desorber 36. The oxygen partial pressure in the desorber is less than the partial pressure of the oxygen bound by the acceptor. Therefore, the oxygen is released as a free oxygen product. The reduced oxygen acceptor solution collects as a liquid 38 in the base of the desorber 36. The free oxygen gas released from the oxygen absorber rises to the head of the column 36 and passes through a filtering element or demister 40 which successfully disentrains any entrained oxygen acceptor from the gas stream.

Substantially pure oxygen product gas in line 48 is removed from the overhead of the desorber column 36. The heat of the oxygen product in line 48 is recovered for the process by heat exchange against the incoming feed air stream in heat exchangers 20 and 16, respectively. The oxygen is further cooled in a heat exchanger against an external cooling fluid, such as ambient temperature water in cooler 50. The oxygen can then be compressed to the required delivery pressure through compressor 52. This is necessary because the desorber will normally be operated at less than atmospheric pressure, although higher pressures are possible. The oxygen product can be removed from the process in line 54 for subsequent use or storage.

Reduced oxygen acceptor, which has been regenerated by the release of bound oxygen from the acceptor species, is removed as a liquid stream 42 from the sump or base of the desorber column 36. The regenerated oxygen acceptor in line 42 is introduced into a cantilever pump 44, which may be mounted in a separate tank, as illustrated, or may be mounted directly in the sump of desorber vessel 36. The pump 44 increases the pressure on the regenerated oxygen acceptor solution and recycles the oxygen acceptor in line 46 back to the top of the absorber column 24. The regenerated oxygen acceptor is then dispersed into the absorber 24 through the nozzles 26.

As oxygen is being absorbed out of the feed air stream 22 in column 24 by the oxygen acceptor material, exit gas is exhausted overhead from the absorber column 24 in line 28. The oxygen-depleted gas in line 28 is at elevated temperature and pressure and contains entrained oxygen acceptor which has potential corrosive effect for process equipment. The gas stream has a residual oxygen content in keeping with the thermodynamic laws of oxygen equilibrium, but the oxygen content is less than the oxygen content of the feed stream in line 22. The predominant species contained in the oxygen-depleted gas stream in line 28 is nitrogen when the feed stream in line 22 is air. An important consideration in making the present process attractive economically and feasible is the integration of process streams and the reduction of incompatability of process equipment with process conditions. The stream in line 28 constitutes a stream which will be vented as waste from the process. Therefore, it is necessary for economic operation to recover the energy values contained in that oxygen-depleted gas stream, before it is vented as waste from the process. The energy values of the stream in line 28 constitute the high pressure of the stream and the elevated temperature of the stream. Both of these energy values need to be recovered and the present invention provides a unique sequence and combination of processing to recover those values from the oxygen-depleted gas stream.

Reduction in the temperature of the oxygen-depleted gas stream is desirable for several reasons. First, the reduction in temperature can constitute the recovery of heat energy when the reduction is conducted in heat exchangers which exchange with process streams, such as the feed air stream. Second, the reduction in temperature of the oxygen-depleted gas stream allows for the condensation and removal of entrained, corrosive oxygen acceptor specie from the gas stream in line 28. The recycle of the condensed oxygen acceptor to the process constitutes another efficiency which can be introduced into the system.

The other energy recovery from the oxygen-depleted gas stream constitutes the recovery of the energy of compression involved in the high pressure stream. By passing the oxygen-depleted gas stream through an expansion turbine to recover power, the energy constituting the high pressure condition of the gas stream can be recovered for the overall process and particuarly for the compression of feed air to the process. In order to successfully use the expansion of the oxygen-depleted gas stream to its full potential as a source of energy by pressure reduction, the stream should be at an elevated temperature, preferably the highest temperature which the expander can experience in relation to the materials which constitute the rotor of the expander turbine. In addition, it is desirable to utilize whatever oxygen content exists in the oxygen-depleted gas stream to attain such high temperature.

In keeping with these desired goals, the present invention processes the oxygen-depleted gas stream in line 28 through the following sequence of stages. The high pressure and high temperature oxygen-depleted gas stream in line 28 is first reduced in temperature to an intermediate temperature level by passage through heat exchanger 20 with the resulting exchange of a portion of its heat value with the warming air stream in line 22. The reduction in temperature of the oxygen-depleted gas stream to an intermediate temperature level after passage through heat exchanger 20 achieves the condensation of entrained vaporous oxygen acceptor. The condensed liquid oxygen acceptor is collected in a phase separation vessel 55 into which the oxygen-depleted gas stream in line 28 is delivered. The amount of condensed oxygen acceptor derived from the cooling oxygen-depleted gas stream may be small in relationship to the overall process flow volumes in the system. Therefore, although continuous removal of oxygen acceptor from the gas stream in line 28 and the sump of separator 55 is possible, the preferred operation of the invention contemplates the intermittent removal of oxygen acceptor in liquid form from the separator 55 by operation of valve 61. Oxygen acceptor, which is condensed out in the liquid form into vessel 55, will be allowed to collect in the sump of that vessel depending upon the rate of entrainment and subsequent condensation of the acceptor liquid. The oxygen acceptor, which will potentially be highly oxidized, will then be removed from separator vessel 55 through open valve 61 and, preferably, recycled in line 66 to the desorber column 36. Pressure reduction to the desorber column may be necessary and will be supplied by valve 68. In this manner, the oxidized oxygen acceptor can be recycled for further use in the overall process. Alternately, condensed oxygen acceptor from vessel 55 may be routed in line 63 to the absorber column 24, if the state of oxidation is not excessive. Finally, when it is desired to remove oxygen acceptor after a period of active life use of the acceptor material, vent of the oxygen acceptor, which is condensed, can be performed through line 64.

The oxygen-depleted gas stream, which has been purified of entrained oxygen acceptor chemical, is then sent from the overhead of separator vessel 55 to a combustor reaction zone 56. The oxygen content of the oxygen-depleted gas stream is combusted with a fuel source in line 58, such as natural gas. This combustion elevates the temperature of the oxygen-depleted gas stream to the optimum inlet temperature to the expander turbine 60. Normally, such combustion might exceed the temperature maximum of the expander turbine 60, but the initial temperature reduction performed in heat exchanger 20 allows the successful control of the maximum temperature after combustion, so as not to exceed the maximum allowable temperature for the gas stream entering the inlet of expander turbine 60. The expander turbine reduces the pressure of the gas stream with the performance of work. The work can constitute the recovery of power by the generation of electrical power, or the work can constitute the recovery of mechanical drive power from the expander, which is delivered to the compressor 12. The remaining heat of the combusted oxygen-depleted gas stream exiting from the turbine 60 is recovered for utilization in the feed air stream by passage through heat exchanger 16. The oxygen-depleted gas stream at near ambient temperature and pressure is then vented in line 62. The gas stream may be used for industrial processes requiring a reduced oxygen content. However, the gas stream now contains carbon dioxide and water resulting from the combustion of the gas stream with the fuel source in line 58.

The unique sequence of process steps performed on the oxygen-depleted gas stream allows the removal of corrosive oxygen acceptor prior to the introduction of the stream into an expensive expanding turbine apparatus, which would be adversely effected by such corrosive qualities of the stream. In addition, the heat exchange of the gas stream prior to the combustion of the stream allows the use of inexpensive apparatus design in heat exchanger 20, which would not be possible in the case of heat exchanger 16, wherein the oxygen-depleted gas stream would contain combustion products of carbon dioxide and water, which constitute a potential corrosion problem in the presence of oxygen acceptor. Finally, the heat exchange of the oxygen-depleted stream prior to combustion or expansion allows for the recovery of valuable oxygen acceptor constituent prior to its potential contamination or destruction in the combustion zone of the combustor 56. The recovery of oxygen acceptor and its recycle to the desorber 36 provides an enhancement in the efficiency of the use of this valuable process constituent. The integration of the various process streams, including the feed air stream, the waste oxygen-depleted gas stream and the oxygen product stream in the unique manner described above, wherein the sequence of heat exchange, condensation, combustion, expansion with power recovery and further heat exchange is performed on the oxygen-depleted gas stream, constitutes a unique improvement in the operation of a chemical oxygen absorbing separation process. The recovery of energy of compression and heat energy, as well as the recovery of oxygen acceptor, all for recycle to the continuous process, provides unique economies to the overall system, which enhance its potential for commercial competition with known chemical gas separation systems and cryogenic separation systems.

The present invention has been described with regard to a preferred embodiment of the invention. However, various obvious modifications will be apparent to those skilled in the art, and such modifications are deemed to be within the scope of the present invention, which scope should be ascertained from the claims which follow.

I claim:

1. In a continuous process for producing oxygen by the repeated steps of contacting a feed air stream with a molten solution of alkali metal nitrate and nitrite oxygen acceptor which becomes oxidized, separately releasing the oxygen from the oxidized oxygen acceptor so as to regenerate the oxygen acceptor and generate product oxygen, recycling the regenerated oxygen acceptor and removing an oxygen-depleted gas stream, the improvement comprising reducing the temperature of the oxygen-depleted gas stream by heat exchange with the feed air stream, condensing residual entrained oxygen acceptor from the oxygen-depleted gas stream, combusting of said gas stream with a fuel to elevate its temperature and expanding the gas stream through a turbine to recover power.

2. The process of claim 1 including the further reduction of temperature of the expanded gas stream by heat exchange with the feed air stream.

3. The process of claim 1 wherein the condensed oxygen acceptor is recycled to contact the feed air stream.

4. The process of claim 1 wherein the condensed oxygen acceptor is recycled for regeneration.

5. The process of claim 1 wherein the feed air stream is compressed to high pressure, dried and heated to an elevated temperature by heat exchange with the oxygen-depleted gas stream before being contacted with oxygen acceptor.

6. The process of claim 5 wherein the power from expanding the combusted gas stream is used to compress the feed air stream.

7. The process of claim 1 wherein the feed air stream is contacted with the molten solution of an oxygen acceptor countercurrently in an absorber column.

8. The process of claim 7 wherein the oxidized oxygen acceptor is transferred to a desorber column and reduced in temperature and pressure to release oxygen and regenerate the acceptor.

9. The process of claim 8 wherein the regenerated oxygen acceptor from the desorber column is pumped to elevated pressure for recycle to the absorber column.

10. The process of claim 1 wherein product oxygen is cooled by heat exchange with the feed gas stream.

11. The process of claim 1 wherein the alkali metal of the oxygen acceptor is predominantly sodium.

12. The process of claim 1 wherein the oxygen acceptor includes at least two molar percent of alkali metal oxides, peroxides, superoxides or their combination.

* * * * *